UNITED STATES PATENT OFFICE.

THE NUTRIO MANUFACTURING COMPANY, OF PHILADELPHIA, PENNSYLVANIA, ASSIGNEE, BY MESNE ASSIGNMENTS, OF R. BERKELEY FITTS.

IMPROVEMENT IN PREPARING WHEAT AND OTHER GRAIN FOR FOOD.

Specification forming part of Letters Patent No. 115,947, dated June 13, 1871; reissue No. 5,654, dated November 11, 1873; application filed September 18, 1873.

*To all whom it may concern:*

Be it known that R. BERKELEY FITTS, of the city and county of Philadelphia and State of Pennsylvania, invented new and useful Improvements in Preparing Wheat and other Grain for Food; and the following is hereby declared to be a full, clear, and exact description of the same.

This invention has for its object to treat wheat and other grain with a view to freeing it from animalcules, musty odors, or other impurities, and also to remove the glutinous properties of the hull, so that the entire grain shall be equally friable, retaining the phosphates and starchy portions, and bringing the nutritious properties into a condition to be more easily digested and more completely assimilated.

To these ends the invention consists, first, in subjecting the grain to the action of steam applied directly thereto under pressure, and continuing the same until the grain is in a proper condition for the mill, or to be put up in packages for the market; secondly, in subjecting the grain to the action of steam under pressure, and following this with dry heat; and, thirdly, in the products of these treatments as new commercial articles.

The process of steaming is as follows: The grain, being first placed in a rotating cylinder made of wire cloth or other suitable material, is inclosed within a chest, to which steam is admitted from a generator for several minutes—say, from five to ten, or more, according to the condition of the grain and the pressure of the steam. From thirty to fifty pounds pressure to the square inch will afford from 275° to 300° of heat, (Fahrenheit,) and, as the object is to cook the grain and convert a portion of the starch into dextrine, this amount of pressure may not be too great. Should the grain not be sufficiently dry, the drying may be continued or completed by any suitable means that will bring the grain to a crisp and thoroughly-desiccated condition fitted for the mill, or for preparation for the table without grinding. Wheat or other cereals thus treated may be cooked and served up either in the whole kernel, or more or less comminuted, requiring much less cooking than the ordinary coarse or cracked grain; or it may be ground into meal to take the place of buckwheat, for pan or griddle cakes, and is altogether more palatable, while in point of dietetic economy it possesses manifold superiority. Indian corn treated in this way, either in the whole kernel or broken into hominy, is vastly improved, its tendency to sour or fall away from its delicious natural flavor being overcome—a very important matter in keeping and in transportation, especially in summer time or warm climates. The restoration to its normal state of sweetness and purity of wheat, corn, rye, barley, and other grains that have been injured by transportation and storage, is deemed a very important feature of this invention. The products of these treatments are put up in sacks, boxes, barrels, or other packages suitable for the mill, or put up for the consumer without grinding, if preferred. The cracked grain, or that ground into meal or flour, is also put up in convenient form for the commercial agent and consumer.

The steaming apparatus may be used with good effect in drying wet grain for milling, storage, transportation, &c.

Having thus described this invention, what is claimed is—

1. The process herein set forth for the treatment of grain by the application thereto of steam under pressure, substantially as described, for the purposes specified.

2. The process of treating grain by the application of steam under pressure, followed by dry heat, substantially as described, for the purpose specified.

3. The products of the above-described treatments, produced by the application of steam under pressure, with or without the application of dry heat, as new commercial articles, substantially as described.

TITUS S. EMERY,
*President of the Nutrio Manufacturing Company.*

Witnesses:
E. C. MANN, Jr.,
C. ABBOTT RUGGLES.